United States Patent
Nagai et al.

(10) Patent No.: US 10,513,604 B2
(45) Date of Patent: Dec. 24, 2019

(54) BINDER RESIN COMPOSITION, ELECTRODE FOR LITHIUM ION SECONDARY BATTERY AND LITHIUM ION SECONDARY BATTERY

(71) Applicant: HITACHI CHEMICAL COMPANY, LTD., Tokyo (JP)

(72) Inventors: Shunsuke Nagai, Tokyo (JP); Hiroki Kuzuoka, Tokyo (JP); Eisuke Haba, Tokyo (JP); Kenji Takaoka, Tokyo (JP); Nobuyuki Ogawa, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 15/558,305

(22) PCT Filed: Mar. 1, 2016

(86) PCT No.: PCT/JP2016/056299
§ 371 (c)(1),
(2) Date: Sep. 14, 2017

(87) PCT Pub. No.: WO2016/147857
PCT Pub. Date: Sep. 22, 2016

(65) Prior Publication Data
US 2018/0057678 A1    Mar. 1, 2018

(30) Foreign Application Priority Data
Mar. 18, 2015   (JP) .................................. 2015-054733

(51) Int. Cl.
| | |
|---|---|
| C08L 23/00 | (2006.01) |
| C08L 33/20 | (2006.01) |
| C08L 101/00 | (2006.01) |
| H01M 4/13 | (2010.01) |
| H01M 4/62 | (2006.01) |
| H01M 10/0525 | (2010.01) |
| C09D 133/18 | (2006.01) |

(52) U.S. Cl.
CPC .............. *C08L 33/20* (2013.01); *C08L 23/00* (2013.01); *C08L 101/00* (2013.01); *C09D 133/18* (2013.01); *H01M 4/13* (2013.01); *H01M 4/622* (2013.01); *H01M 10/0525* (2013.01); *C08L 2203/20* (2013.01); *H01M 2220/30* (2013.01); *Y02T 10/7011* (2013.01)

(58) Field of Classification Search
CPC ........ C08L 33/20; C08L 23/00; C08L 101/00; C08L 2203/20; H01M 4/13; H01M 4/622; H01M 2220/30; C09D 133/18
See application file for complete search history.

(56) References Cited

U.S. PATENT DOCUMENTS

| | | | |
|---|---|---|---|
| 6,440,605 B1 * | 8/2002 | Kise et al. | H01M 2/34 29/623.1 |
| 6,855,378 B1 * | 2/2005 | Narang | H01G 4/228 257/E21.174 |
| 2006/0216609 A1 * | 9/2006 | Abe et al. | H01M 4/13 429/246 |
| 2008/0274411 A1 * | 11/2008 | Nakajima et al. | H01M 10/0525 429/322 |
| 2008/0292965 A1 * | 11/2008 | Kubota et al. | H01M 4/0435 429/246 |
| 2015/0280241 A1 * | 10/2015 | Hara et al. | H01G 11/66 429/233 |
| 2018/0040899 A1 * | 2/2018 | Kuzuoka et al. | H01M 4/13 |

FOREIGN PATENT DOCUMENTS

| | | |
|---|---|---|
| JP | H10-241665 A | 9/1998 |
| JP | 2002-313318 A | 10/2002 |
| JP | 2009-004360 A | 1/2009 |
| JP | 2009-176599 A | 8/2009 |
| JP | 2010-092719 A | 4/2010 |
| JP | 2014-029788 A | 2/2014 |
| JP | 2015-050084 A | 3/2015 |

OTHER PUBLICATIONS

International Search Report for PCT/JP2016/056299 dated May 17, 2016; English translation submitted herewith (3 pages).

* cited by examiner

*Primary Examiner* — Nathan M Nutter
(74) *Attorney, Agent, or Firm* — Fitch, Even, Tabin & Flannery, LLP

(57) ABSTRACT

The present disclosure provides a binder resin composition comprising a polyolefin particle, an organic solvent and a polymer that is soluble in the organic solvent, as well as an electrode for a lithium ion secondary battery and a lithium ion secondary battery each using the binder resin composition.

7 Claims, 1 Drawing Sheet

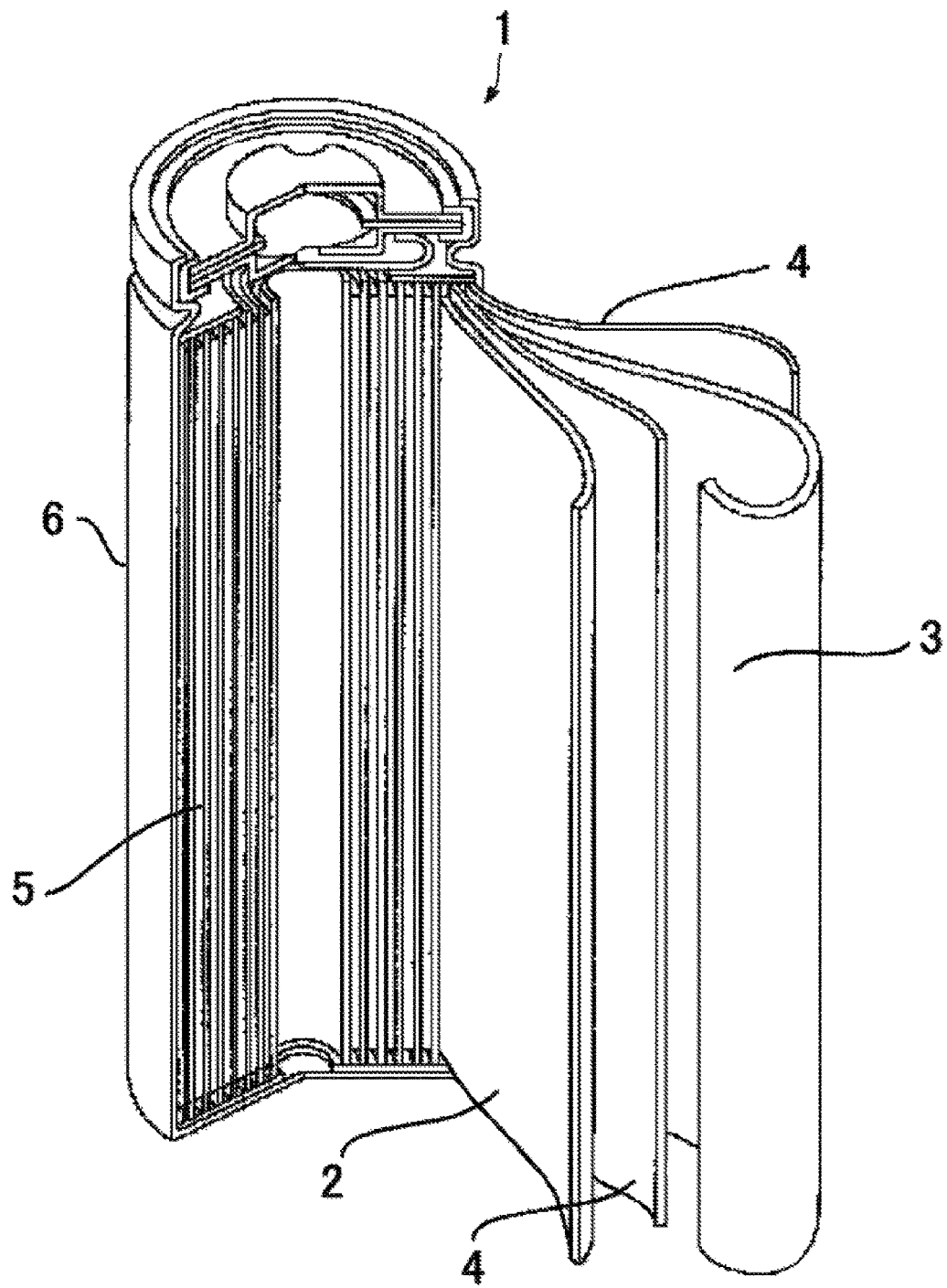

BINDER RESIN COMPOSITION, ELECTRODE FOR LITHIUM ION SECONDARY BATTERY AND LITHIUM ION SECONDARY BATTERY

CROSS-REFERENCE TO RELATED APPLICATIONS

This application is a U.S. national phase application filed under 35 U.S.C. § 371 of International Application No. PCT/JP 2016/056299, filed Mar. 1, 2016, designating the United States, which claims benefit of the filing date of JP 2015-054733, filed Mar. 18, 2015, which is hereby incorporated herein by reference in its entirety.

TECHNICAL FIELD

The present invention relates to a binder resin composition, and an electrode for a lithium ion secondary battery and a lithium ion secondary battery each using the binder resin composition.

BACKGROUND ART

Lithium ion secondary batteries are broadly used as energy devices with a high energy density as power sources for portable information terminals such as notebook computers and cell phones. For typical lithium ion secondary batteries, a group of wound electrodes obtained by layering a cathode, an insulation layer, an anode, and an insulation layer in this order and winding the same, or a group of laminated electrodes obtained by layering a cathode, an insulation layer, an anode, and an insulation layer, has been used. As an active material for an anode, a carbon material having a multilayer structure capable of intercalating a lithium ion between layers (formation of a lithium intercalation compound) and releasing the same is mainly used. As an active material for a cathode, a lithium-containing metal complex oxide. As an insulation layer, a polyolefin porous film is mainly used. Such lithium ion secondary batteries have high battery capacities and output powers as well as superior charge and discharge cycle performances.

Although lithium ion secondary batteries are at a high level in terms of safety, further improvement of safety has been demanded in view of their high capacities and high power. For example, when lithium ion secondary batteries are overcharged or an internal short-circuit occurs, there is possibility of heat generation. Moreover, since lithium ion secondary batteries contain a nonaqueous electrolyte containing an organic solvent, there is the possibility that the generated heat will cause chemical degradation of the organic solvent to generate a gas, leading to a trouble such as an increase in an internal pressure of a battery.

Currently, further improvement of the safety of lithium ion secondary batteries is intended by cutting off a current inside the batteries to suppress heat generation, when the lithium ion secondary batteries are overcharged or the like. Examples of means for improving safety include: (1) a method of utilizing a mechanism, such as a safety valve provided in a sealing plate, which detects an internal pressure of a battery and cuts off the current; (2) a method in which a sealing plate is provided with a member composed of a PTC (Positive temperature coefficient) element of which electrical resistance increases according to the heat generation in the battery, and the current is cut off when the PTC element becomes a nonconductor; and (3) a method in which an insulation layer meltable corresponding to heat generation in the battery is used, and when the insulation layer melts down, movement of a lithium ion between a cathode and an anode is inhibited so that the current is cut off.

Meanwhile, as another method for cutting off a current to suppress heat generation, an electrode provided with a PTC layer has been proposed (for example, Japanese National-Phase Publication (JP-A) No. 2009-176599). A PTC layer indicates, similar to a PTC element, a layer having a function to increase the electrical resistance (direct current resistance) corresponding to heat generation of a battery. The electrode (at least one of a cathode and an anode) according to JP-A No. 2009-176599 is a layered body in which a cathode active material layer or an anode active material layer, a PTC layer, and a current collector are layered in this order.

Furthermore, according to JP-A No. H10-241665, a method in which a PTC electrically conductive material of which electrical resistance (direct current resistance) increases according to the heat generation in the battery is used in an electrode active material layer has been proposed.

SUMMARY OF INVENTION

Technical Problem

However, when the method (1) is used, since progress of a degradation reaction of an electrolyte solution, which causes a change in an internal pressure of a battery, is strongly affected not only by a battery temperature but also by a battery voltage, an environment temperature and the like, a response to heat generation becomes imprecise, and the inhibitory effect against heat generation may become insufficient. By the method (2), since an electrode group, which is a main heat generator, and a PTC element in a sealing plate are located with a certain distance from each other, the responsiveness of the PTC element with respect to heat generation may be lowered and the inhibitory effect against heat generation may become insufficient. By the method (3), it is necessary to use an insulation layer which melts responding well to heat generation in a battery. However, when such an insulation layer is used, for instance, a higher power or improved charge and discharge cycle performance of a battery may not be attained satisfactorily.

Meanwhile, a PTC layer according to JP-A No. 2009-176599 contains a resin particle and an electrically conductive particle, and is intended to cut off a current, in a case in which a resin particle melts due to overheating and electrically conductive particles fall into a state of noncontact condition. However, in the electrode including the PTC layer of JP-A No. 2009-176599, there has been problem that a process for producing an electrode becomes complicated because the PTC layer is formed between a current collector and an electrode active material layer.

Furthermore, the PTC electrically conductive material described in JP-A No. H10-241665 is a fine particle formed by pulverizing a pellet, in which carbon black and polyethylene are mixed, by a jet mill system. JP-A No. H10-241665 discloses that the fine particle is included in an electrode active material layer, thereby exhibiting a PTC function. The PTC electrically conductive material described in JP-A No. H10-241665, however, is low in electrical conductivity, resulting in deterioration of battery characteristics, because the electrically conductive material is mixed with polyethylene,. Furthermore, it has been found from the results of studies of the inventors that the PTC electrically conductive material described in JP-A No. H10-241665 is not sufficient in the rate of internal resistance increase of a battery at high temperatures.

The present invention was made in view of such problems with an object to provide an electrode for a lithium ion secondary battery, which has a function of increasing the internal resistance (hereinafter also referred to as "direct current resistance") of a battery when a temperature increases, superior battery characteristics in a normal operation, and a process for producing thereof is simple, as well as a lithium ion secondary battery and a binder resin composition enabling application for producing the same.

Solution to Problem

Specific means for achieving the object include the following embodiments.

<1> A binder resin composition comprising:
a polyolefin particle;
an organic solvent; and
a polymer that is soluble in the organic solvent.

<2> The binder resin composition according to <1>, in which an average particle diameter of the polyolefin particle is from 0.1 µm to 30 µm.

<3> The binder resin composition according to <1> or <2>, in which an content of the polyolefin particle is from 1% by mass to 60% by mass.

<4> The binder resin composition according to any one of <1> to <3>, in which the polymer includes at least one selected from the group consisting of a resin having a nitrile group and polyvinylidene fluoride.

<5> The binder resin composition according to any one of <1> to <4>, in which the organic solvent includes N-methyl-2-pyrrolidone.

<6> The binder resin composition according to any one of <1> to <5>, in which a viscosity of the binder resin composition is from 100 mPa·s to 1,500 mPa·s measured with an E-type viscometer at 25° C. at a rotation speed of 50 rotations per minute.

<7> An electrode for a lithium ion secondary battery, produced by using the binder resin composition according to any one of <1> to <6>.

<8> A lithium ion secondary battery, including the electrode for a lithium ion secondary battery according to <7>.

Advantageous Effects of Invention

According to the invention, an electrode for a lithium ion secondary battery, which has a function of increasing the internal resistance of a battery when a temperature increases, superior battery characteristics in a normal operation, and a process for producing thereof is simple, as well as a lithium ion secondary battery and a binder resin composition enabling application for producing the same.

BRIEF DESCRIPTION OF DRAWINGS

The Figure is a perspective cross-sectional view of a cylindrical lithium ion secondary battery of an embodiment to which the invention is applicable.

DESCRIPTION OF EMBODIMENTS

Preferable Embodiments of the invention will be described below. The matter necessary for carrying out the invention, other than that specifically referred to herein, may be construed as a design matter to be supported by the conventional techniques in the pertinent art, for a person skilled in the art. The invention can be carried out on the basis of the contents disclosed herein and the common technical knowledge in the pertinent art. In the drawings presented below, dimensional relationships (length, width, thickness, or the like) in the drawings do not necessarily reflect the actual dimensional relationships.

A numerical range expressed herein by "x to y" includes the values of x and y in the range as the minimum and maximum values, respectively.

With respect to numerical ranges stated hierarchically herein, the upper limit or the lower limit of a numerical range of a hierarchical level may be replaced with the upper limit or the lower limit of a numerical range of another hierarchical level. Further, with respect to a numerical range stated herein, the upper limit or the lower limit of the numerical range may be replaced with a relevant value stated in any of Examples.

In referring herein to a content of a component in a composition, when plural kinds of substances exist corresponding to a component in the composition, the content means, unless otherwise specified, the total amount of the plural kinds of substances existing in the composition.

In referring herein to a particle diameter of a component in a composition, when plural kinds of particles exist corresponding to a component in the composition, the particle diameter means, unless otherwise specified, a value with respect to the mixture of the plural kinds of particles existing in the composition.

The term "layer" comprehends herein not only a case in which the layer is formed over the whole observed region where the layer is present, but also a case in which the layer is formed only on part of the region.

The term "layered" means herein to layer layers one on another, and two or more layers may be bonded together, or two or more layers may be detachable.

A technique of the invention can be widely applied to various nonaqueous secondary batteries in which electrode active material layers (cathode active material layer and anode active material layer) are formed on current collectors, but applications thereof are not intended to be limited.

As one embodiment of the present invention, a binder resin composition, an electrode for a lithium ion secondary battery and a lithium ion secondary battery will be described below.

[Binder Resin Composition]

A binder resin composition according to the embodiment includes a polyolefin particle, an organic solvent and a polymer that is soluble in the organic solvent.

(Polyolefin Particle)

The binder resin composition of the embodiment includes a polyolefin particle. The polyolefin particle means a particle of an olefin polymer (polyolefin resin) in which the proportion of an olefin structural unit in the molecule is 50% by mass or more.

The polyolefin particle is not particularly limited. Examples of the polyolefin particle include a particle made of polyethylene, polypropylene, polymethylpentene or polybutene, or a modified product thereof. Among them, the polyolefin particle is preferably a particle made of polyethylene or a modified product of polyethylene, or polypropylene or a modified product of polypropylene, from the viewpoints of oxidation resistance and reduction resistance. The polyolefin particles may be used singly, or in combination of two or more kinds thereof.

The average particle diameter of the polyolefin particles is preferably from 0.1 µm to 30 µm, more preferably from 0.6 µm to 20 µm, and still more preferably from 3 µm to 20 µm.

As the particle diameter of the polyolefin particle is smaller, the polyolefin particle may be widely and uniformly dispersed in an electrode active material layer, and as the average particle diameter of the polyolefin particle is larger, dispersibility of the binder resin composition may be improved.

The average particle diameter of the polyolefin particle can be a numerical value obtained by, for example, preparing a current collector on which an electrode active material layer including the polyolefin particle is formed so as to have a thickness of about 70 μm, taking an image of a range of 50 μm in length×50 μm in width of the central portion of the current collector by a transmission electron microscope, and determining the arithmetic average of the length values in the longitudinal direction of all polyolefin particles in the image. The length in the longitudinal direction of the polyolefin particle means the maximum distance between two parallel tangent lines which are circumscribed to the circumference of the polyolefin particle in a two-dimensional image of the polyolefin particle observed with a transmission electron microscope.

The content of the polyolefin particle in the binder resin composition (also including the organic solvent) is preferably from 1% by mass to 60% by mass, more preferably from 5% by mass to 50% by mass, still more preferably from 10% by mass to 50% by mass. A lithium ion secondary battery produced by using the binder resin composition may be improved in battery characteristics as the content of the polyolefin particle is lower, and such a lithium ion secondary battery may be improved in PTC characteristics as the content of the polyolefin particle is higher.

The melting point (Tm) of the polyolefin particle is not particularly limited. A polyolefin particle having a melting point (Tm) of from 70° C. to 160° C. is preferable, a polyolefin particle having a melting point (Tm) of from 80° C. to 150° C. is more preferable, and a polyolefin particle having a melting point (Tm) of from 90° C. to 140° C. is still more preferable from the viewpoint of improvement of handleability and safety of the lithium ion secondary battery produced by using the binder resin composition. As the melting point (Tm) of the polyolefin particle is lower, a PTC function may be exhibited at a lower temperature, thereby resulting in improvement of safety. As the melting point (Tm) of the polyolefin particle is higher, malfunctioning in a normal operation can be suppressed and the electrode drying temperature can be set at a higher temperature, thereby resulting in improvement of productivity.

A melting point (Tm) of a polyolefin particle may be calculated from an endothermic peak temperature after measuring a specific heat capacity of the polyolefin particle in an inert gas as a function of temperature using a differential scanning calorimeter.

(Polymer Soluble in Organic Solvent)

The binder resin composition of the embodiment contains a polymer that is soluble in an organic solvent described below. Here, the phrase "soluble in the organic solvent" means that 1 g or more of the polymer can be dissolved in 100 mL of the organic solvent at room temperature (25° C.).

The polymer that is soluble in the organic solvent is not particularly limited. Examples of the polymer that is soluble in the organic solvent include carboxymethylcellulose, a carboxymethylcellulose derivative such as carboxymethylcellulose sodium, polyvinyl alcohol, polyvinyl pyrrolidone, an alginic acid derivative, a polyacrylic acid derivative, a resin having a nitrile group, and polyvinylidene fluoride. The polymer that is soluble in the organic solvent may be used singly, or in combination of two or more kinds thereof. The polymer that is soluble in the organic solvent is preferably at least one selected from the group consisting of a resin having a nitrile group and polyvinylidene fluoride from the viewpoints of adhesiveness, flexibility and battery characteristics.

Examples of the resin having a nitrile group include a homopolymer of acrylonitrile, and a copolymer of acrylonitrile with other compound having an ethylenically unsaturated bond. In a case in which the binder resin composition is used to produce an electrode, the resin having a nitrile group preferably has a structural unit having a nitrile group, and at least one structural unit selected from the group consisting of a structural unit derived from a monomer represented by the following Formula (I) and a structural unit derived from a monomer represented by the following Formula (II), from the viewpoint of further improvement of flexibility and bindability. The resin having a nitrile group preferably has a structural unit having a carboxyl group from the viewpoint of further improvement of bindability. The structural unit having a nitrile group may be a structural unit derived from a nitrile group-containing monomer. The structural unit having a carboxyl group may be a structural unit derived from a carboxyl group-containing monomer.

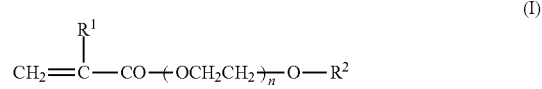

In Formula, $R^1$ is H or $CH_3$, $R^2$ is H or monovalent hydrocarbon group, and n is a number of from 1 to 50.

In Formula, $R^3$ is H or $CH_3$, $R^4$ is an alkyl group having from 4 to 100 carbon atoms.

<Nitrile Group-Containing Monomer>

The nitrile group-containing monomer is not particularly limited. Examples of the nitrile group-containing monomer include an acrylic nitrile group-containing monomer such as acrylonitrile or methacrylonitrile, a cyanic nitrile group-containing monomer such as α-cyanoacrylate or dicyanovinylidene, and a fumaric nitrile group-containing monomer such as fumaronitrile. Among them, acrylonitrile is preferable from the viewpoints of easiness of polymerization, cost performance, softness and flexibility of an electrode produced by using the binder resin composition, and the like. The nitrile group-containing monomer may be used singly or in a combination of two or more kinds thereof. In a case in which acrylonitrile and methacrylonitrile are used as a nitrile group-containing monomer, acrylonitrile is preferably contained, for example, in a range from 5% by mass to 95% by mass, more preferably in a range from 50% by mass to 95% by mass, with respect to the total amount of the nitrile group-containing monomer.

<Monomer Represented by Formula (I)>

There is no particular restriction on a monomer represented by Formula (I).

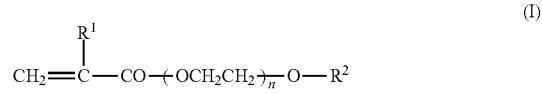

Herein, in Formula, $R^1$ is H, or $CH_3$.

n is a number of from 1 to 50, preferably a number of from 2 to 30, and more preferably a number of from 2 to 10. n is a structural unit number, and it is an integer number for a single molecule, but it is a rational number, which is an average value, for a group of a plurality of kinds of molecule.

$R^2$ is H or monovalent hydrocarbon group, for example, preferably a hydrocarbon group having from 1 to 50 carbon atoms, more preferably a hydrocarbon group having from 1 to 25 carbon atoms, and further preferably a hydrocarbon group having from 1 to 12 carbon atoms. When the carbon number of a hydrocarbon group is 50 or less, sufficient resistance to swelling by an electrolyte solution may be obtained. Preferable examples of a hydrocarbon group include an alkyl group or a phenyl group. More preferable examples of $R^2$ include an alkyl group having from 1 to 12 carbon atom or a phenyl group. The alkyl group may be a straight chain, or a branched chain. When $R^2$ is an alkyl group or a phenyl group, the alkyl group or the phenyl group may be substituted with a halogen atom such as fluorine, chlorine, bromine and iodine, a nitrogen-containing group, a phosphorus-containing group, an oxygen-containing group, an aromatic ring group, a cycloalkyl group having from 3 to 10 carbon atoms, or the like. A carbon number of $R^2$ when $R^2$ has a substituent group is defined as a carbon number after the removal of the substituent group.

Specific examples of a commercially available monomer represented by Formula (I) include ethoxydiethylene glycol acrylate (trade name: LIGHT ACRYLATE EC-A, produced by Kyoeisha Chemical Co., Ltd.), methoxytriethylene glycol acrylate (trade name: LIGHT ACRYLATE MTG-A, produced by Kyoeisha Chemical Co., Ltd.; and trade name: NK ESTER AM-30G, produced by Shin-Nakamura Chemical Co., Ltd.), methoxy poly(n=9) ethylene glycol acrylate (trade name: LIGHT ACRYLATE 130-A, produced by Kyoeisha Chemical Co., Ltd.; and trade name: NK ESTER AM-90G, produced by Shin-Nakamura Chemical Co., Ltd.), methoxy poly(n=13) ethylene glycol acrylate (trade name: NK ESTER AM-130G, produced by Shin-Nakamura Chemical Co., Ltd.), methoxy poly(n=23) ethylene glycol acrylate (trade name: NK ESTER AM-230G, produced by Shin-Nakamura Chemical Co., Ltd.), octoxy poly(n=18) ethylene glycol acrylate (trade name: NK ESTER A-OC-18E, produced by Shin-Nakamura Chemical Co., Ltd.), phenoxydiethylene glycol acrylate (trade name: LIGHT ACRYLATE P-200A, produced by Kyoeisha Chemical Co., Ltd.; and trade name: NK ESTER AMP-20GY, produced by Shin-Nakamura Chemical Co., Ltd.), phenoxy poly(n=6) ethylene glycol acrylate (trade name: NK ESTER AMP-60G, produced by Shin-Nakamura Chemical Co., Ltd.), nonylphenol EO adduct(n=4) acrylate (trade name: LIGHT ACRYLATE NP-4EA, produced by Kyoeisha Chemical Co., Ltd.), nonylphenol EO adduct(n=8) acrylate (trade name: LIGHT ACRYLATE NP-BEA, produced by Kyoeisha Chemical Co., Ltd.), methoxydiethylene glycol methacrylate (trade name: LIGHT ESTER MC, produced by Kyoeisha Chemical Co., Ltd.; and trade name: NK ESTER M-20G, produced by Shin-Nakamura Chemical Co., Ltd.), methoxytriethylene glycol methacrylate (trade name: LIGHT ESTER MTG, produced by Kyoeisha Chemical Co., Ltd.), methoxy poly(n=9) ethylene glycol methacrylate (trade name: LIGHT ESTER 130MA, produced by Kyoeisha Chemical Co., Ltd.; and trade name: NK ESTER M-90G, produced by Shin-Nakamura Chemical Co., Ltd.), methoxy poly(n=23) ethylene glycol methacrylate (trade name: NK ESTER M-230G, produced by Shin-Nakamura Chemical Co., Ltd.), and methoxy poly(n=30) ethylene glycol methacrylate (trade name: LIGHT ESTER 041MA, produced by Kyoeisha Chemical Co., Ltd.). In this regard, "EO" means ethyleneoxy group, n means average of a structural unit number of ethyleneoxy group. Among them, methoxytriethylene glycol acrylate (in Formula (I), $R^1$ is H, $R^2$ is $CH_3$, and n is 3) is more preferable from the viewpoint of copolymerization reactivity with nitrile group-containing monomer, or the like. The monomers represented by Formula (I) may be used singly or in a combination of two or more kinds thereof.

<Monomers Represented by Formula (II)>

There is no particular restriction on a monomers represented by Formula (II).

(II)

In Formula, $R^3$ is H or $CH_3$. $R^4$ is H, or an alkyl group having from 4 to 100 carbon atoms, preferably an alkyl group having from 4 to 50 carbon atoms, more preferably an alkyl group having from 6 to 30 carbon atoms, and further preferably an alkyl group having from 8 to 15 carbon atoms. When the carbon number of an alkyl group is four or more, an electrode produced by using the binder resin composition may have sufficient flexibility. When the carbon number of an alkyl group is 100 or less, sufficient resistance to swelling against an electrolyte solution may be obtained. An alkyl group constituting $R^4$ may be a straight chain, a branched chain, or a ring. Further, an alkyl group constituting $R^4$ may be substituted with a halogen atom such as fluorine, chlorine, bromine and iodine, nitrogen-containing group, a phosphorus-containing group, an oxygen-containing group, an aromatic ring group, a cycloalkyl group having from 3 to 10 carbon atoms, or the like. A carbon number of $R^4$ when $R^4$ has a substituent group is defined as a carbon number after the removal of the substituent group. Examples of an alkyl group constituting $R^4$ include a straight chain or branched chain saturated alkyl group as well as a halogenated alkyl group such as a fluoroalkyl group, a chloroalkyl group, a bromoalkyl group and an alkyl iodide group.

Specific examples of a monomer represented by Formula (II) when $R^4$ is a straight chain, a branched chain or a cyclic alkyl group include a (meth)acrylic acid ester, such as n-butyl (meth)acrylate, isobutyl (meth)acrylate, t-butyl (meth)acrylate, amyl (meth)acrylate, isoamyl (meth)acrylate, hexyl (meth)acrylate, heptyl (meth)acrylate, octyl (meth)acrylate, 2-ethylhexyl (meth)acrylate, nonyl (meth)acrylate, decyl (meth)acrylate, isodecyl (meth)acrylate, lauryl (meth)acrylate, tridecyl (meth)acrylate, hexadecyl (meth)acrylate, stearyl (meth)acrylate, isostearyl (meth)acrylate, cyclohexyl (meth)acrylate, and isobornyl (meth)acrylate. Further, when $R_4$ is a fluoroalkyl group, examples of the monomer include an acrylate compound such as 1,1-bis(trifluoromethyl)-2,2,2-trifluoroethyl acrylate, 2,2,3,3,4,4,4-heptafluorobutyl acrylate, 2,2,3,4,4,4-hexafluorobutyl acrylate, nonafluoroisobutyl acrylate, 2,2,3,3,4,4,5,5-octafluoropentyl acrylate, 2,2,3,3,4,4,5,5,5-nonafluoropentyl acrylate, 2,2,3,3,4,4,5,5,6,6,6-undecafluorohexyl acrylate, 2,2,3,3,4,4,5,5,6,6,7,7,8,8,8-pentadecafluorooctyl acrylate, 3,3,4,4,5,5,6,6,7,7,8,8,9,9,10,10,10-heptadecafluorodecyl acrylate, and 2,2,3,3,4,4,5,5,6,6,7,7,8,8,9,9,10,10,10-nonadecafluorodecyl acrylate; and a methacrylate compound such as nonafluoro-t-butyl methacrylate, 2,2,3,3,4,4,4-heptafluorobutyl methacrylate, 2,2,3,3,4,4,5,5-octafluoropentyl methacrylate, 2,2,3,3,4,4,5,5,6,6,7,7-dodecafluoroheptyl methacrylate, heptadecafluorooctyl methacrylate, 2,2,3,3,4, 4,5,5,6,6,7,7,8,8,8-pentadecafluorooctyl methacrylate, and 2,2,3,3,4,4,5,5,6,6,7,7,8,8,9,9-hexadecafluorononyl methacrylate. In this regard, (meth)acrylate means acrylate or methacrylate, and (meth)acrylic acid means acrylic acid, or methacrylic acid. The monomers represented by Formula (II) may be used singly or in a combination of two or more kinds thereof.

<Carboxyl Group-containing Monomer>

There is no particular restriction on a carboxyl group-containing monomer. Examples of the carboxyl group-containing monomer include an acrylic carboxyl group-containing monomer such as acrylic acid, and methacrylic acid; a crotonic carboxyl group-containing monomer such as crotonic acid; a maleic carboxyl group-containing monomer such as maleic acid and an anhydride thereof an itaconic carboxyl group-containing monomer such as itaconic acid and an anhydride thereof; and a citraconic carboxyl group-containing monomer such as citraconic acid and an anhydride thereof. Among them, acrylic acid is preferable from the viewpoint of easiness of polymerization, cost performance, softness and flexibility of an electrode produced by using the binder resin composition, and the like. The carboxyl group-containing monomers may be used singly or in a combination of two or more kinds thereof.

When acrylic acid and methacrylic acid are used as a carboxyl group-containing monomer, acrylic acid is contained for example in a range of from 5% by mass to 95% by mass, and preferably in a range of from 50% by mass to 95% by mass, with respect to the total amount of carboxyl group-containing monomers.

<Other Monomer>

The resin having a nitrile group may also combine appropriately a structural unit derived from the nitrile group-containing monomer, and at least one selected from the group consisting of a structural unit having a carboxyl group, a structural unit derived from a monomer represented by Formula (I) and a structural unit derived from a monomer represented by Formula (II), and additionally a structural unit derived from a monomer other than the monomers. There is no particular restriction on such other monomer. Examples thereof include a (meth)acrylic acid ester such as methyl (meth)acrylate, ethyl (meth)acrylate and propyl (meth)acrylate, a halogenated vinyl compound such as vinyl chloride, vinyl bromide and vinylidene chloride, a styrene compound such as styrene, α-methylstyrene and sodium styrenesulfonate, an imide compound such as maleimide, N-phenylmaleimide, an amide compound such as (meth) acrylamide, vinyl acetate, sodium (meth)allyl sulfonate, sodium (meth)allyloxybenzene sulfonate, 2-acrylamide-2-methylpropane sulfonic acid and a salt thereof. In this regard, (meth)acrylamide means acrylamide, or meth methacrylamide, and (meth)acrylamide means acrylamide, or methacrylamide. Such other monomers may be used singly or in a combination of two or more kinds thereof.

<Content of Structural Unit>

When the resin having a nitrile group has in addition to a structural unit derived from a nitrile group-containing monomer and a structural unit having a carboxyl group, as well as at least one selected from the group consisting of a structural unit derived from a monomer represented by Formula (I) and a structural unit derived from a monomer represented by Formula (II), as for molar ratios among a structural unit derived from a nitrile group-containing monomer, a structural unit having a carboxyl group, and the total of a structural unit derived from a monomer represented by Formula (I) and a structural unit derived from a monomer represented by Formula (II), for example, with respect to 1 mol of a structural unit derived from a nitrile group-containing monomer, a structural unit having a carboxyl group is preferably from 0.01 mol to 0.2 mol, more preferably from 0.02 mol to 0.1 mol, and further preferably 0.03 mol to 0.06 mol; and the total of a structural unit derived from a monomer represented by Formula (I) and a structural unit derived from a monomer represented by Formula (II) is preferably from preferably 0.001 mol to 0.2 mol, more preferably from 0.003 mol to 0.05 mol, and further preferably from 0.005 mol to 0.02 mol. When a structural unit having a carboxyl group is from 0.01 mol to 0.2 mol, and the total of a structural unit derived from a monomer represented by Formula (I) and a structural unit derived from a monomer represented by Formula (II) is from 0.001 mol to 0.2 mol, the adhesiveness to a current collector, especially to a current collector using a copper foil, in a lithium ion secondary battery produced by using the binder resin composition, and the resistance to swelling against an electrolyte solution become excellent, and the softness and flexibility of electrode become favorable.

When other monomer is used, with respect to 1 mol of a structural unit derived from a nitrile group-containing monomer, a content of a structural unit derived from other monomer is preferably from 0.005 mol to 0.1 mol, more preferably from 0.01 mol to 0.06 mol, and further preferably 0.03 mol to 0.05 mol.

A content of the polymer that is soluble in the organic solvent is preferably from 0.1% by mass to 30% by mass, more preferably from 1% by mass to 20% by mass, still more preferably from 2% by mass to 10% by mass with respect to the total amount of the binder resin composition (also including the organic solvent) from the viewpoints of electrode adhesiveness and battery capacity of a lithium ion secondary battery produced by using the binder resin composition.

(Organic Solvent)

A binder resin composition according to the embodiment contains an organic solvent. There is no particular restriction on an organic solvent. Examples of the organic solvent include an alcohol solvent such as ethanol, propanol, butanol, methyl cellosolve, butyl cellosolve and propylene glycol monomethyl ether; a ketone solvent such as acetone, methyl ethyl ketone, methyl isobutyl ketone and cyclohexanone; an ether solvent such as tetrahydrofuran; an aromatic solvent such as toluene, xylene and mesitylene, a nitrogen-containing solvent such as dimethylformamide, dimethylacetoamide and N-methyl-2-pyrolidone, a sulfur-containing solvent such as dimethylsulfoxide. The organic solvent may be used singly, or in combination of two or more kinds thereof. The organic solvent preferably includes N-methyl-2-pyrolidone from a viewpoint of solubility. A viscosity of the binder resin composition is preferably from 100 mPa·s to 1,500 mPa·s, more preferably from 100 mPa·s to 1,000 mPa·s, still more preferably from 200 mPa·s to 800 mPa·s, measured with an E-type viscometer at 25° C. at a rotation speed of 50 rotations per minute, from the viewpoint of dispersibility and storage stability.

(Use in Electrode for Lithium Ion Secondary Battery)

The binder resin composition is superior in dispersion stability of the polyolefin particle, and can be applied to production of an electrode for a lithium ion secondary battery. The electrode for a lithium ion secondary battery, produced by using the binder resin composition, is superior in uniformity and adhesion strength of an electrode active material layer, and is also high in flexibility of the electrode. Moreover, a lithium ion secondary battery produced by using the above electrode has a function of increasing the internal resistance of the battery when a temperature increases, and has superior battery characteristics in a normal operation, and also a process for producing thereof is simple.

[Electrode for Lithium Ion Secondary Battery, and Lithium Ion Secondary Battery]

An electrode for a lithium ion secondary battery of the embodiment (hereinafter, simply referred to the "electrode of the embodiment".) is produced by using the binder resin composition of the embodiment. The electrode of the embodiment may be one or both of a cathode and an anode. The lithium ion secondary battery of the embodiment includes the electrode of the embodiment.

Hereinafter, one example of the lithium ion secondary battery of the embodiment including the electrode of the embodiment will be described. The lithium ion secondary battery of the embodiment includes a cathode, an anode, an insulation layer, and a nonaqueous electrolyte. While the following description will be made under the assumption that the binder resin composition of the embodiment is used even in production of each of the cathode and the anode, the binder resin composition of the embodiment may be used in production of at least one of the cathode and the anode.

(Cathode)

A cathode is provided to face an anode via an insulation layer, and includes a cathode current collector, and a cathode active material layer.

The cathode active material layer contains a cathode active material, and is formed on the cathode current collector. The formation method is not limited, and the cathode active material layer is formed, for example, as follows: the cathode active material, the binder resin composition, and other material such as an electroconductive material, if necessary used, are mixed in a dry manner, thereby forming a sheet, and the sheet is pressure-bonded to the cathode current collector (dry method); alternatively, the cathode active material, the binder resin composition, and other material such as an electroconductive material, if necessary used, are dissolved or dispersed in a dispersion solvent, thereby forming a cathode mixture paste, the cathode current collector is coated with the cathode mixture paste, and the resultant is dried (wet method).

Examples of the cathode current collector include a sheet, a foil or the like containing a stainless steel, aluminium, titanium, or the like. Among them, a sheet or a foil containing aluminium is preferable. The average thickness of a sheet and a foil is not particularly limited, and is, for example, preferably from 1 μm to 500 μm, more preferably from 2 μm to 100 μm, and still more preferably from 5 μm to 50 μm.

The cathode active material layer is formed on either surface or both surfaces in the thickness direction of a cathode current collector, and contains a cathode active material, and, if necessary, may further contain an electroconductive material, or the like. As a cathode active material, those used commonly in the technical field may be used, and examples thereof include a lithium-containing composite metal oxide, an olivine type lithium salt, a chalcogen compound, and manganese dioxide.

The lithium-containing composite metal oxide is a metallic oxide containing lithium and a transition metal, or a metallic oxide in which a part of the transition metal in the metallic oxide is replaced with a different element. Examples of such a different element include Na, Mg, Sc, Y, Mn, Fe, Co, Ni, Cu, Zn, Al, Cr, Pb, Sb, V and B, and Mn, Al, Co, Ni, Mg or the like are preferable. The different elements may be used singly, or in combination of two or more kinds thereof.

Among them, a lithium-containing composite metal oxide is preferable as the cathode active material. Examples of the lithium-containing composite metal oxide include $Li_xCoO_2$, $Li_xNiO_2$, $Li_xMnO_2$, $Li_xCo_yNi_{1-y}O_2$, $Li_xCo_yM^1_{1-y}O_z$, (in the formulas, $M^1$ represents at least one element selected from the group consisting of Na, Mg, Sc, Y, Mn, Fe, Ni, Cu, Zn, Al, Cr, Pb, Sb, V and B), $Li_xNi_{1-y}M^2_yO_z$ (in the formulas, $M^2$ represents at least one element selected from the group consisting of Na, Mg, Sc, Y, Mn, Fe, Co, Cu, Zn, Al, Cr, Pb, Sb, V and B), $Li_xMn_2O_4$, and $Li_xMn_{2-y}M^3_yO_4$ (in the formulas, $M^3$ represents at least one element selected from the group consisting of Na, Mg, Sc, Y, Fe, Co, Ni, Cu, Zn, Al, Cr, Pb, Sb, V and B). Herein, in the formulas, x=more than 0 and 1.2 or less, y=from 0 to 0.9, and z=from 2.0 to 2.3. The x value representing the molar ratio of lithium fluctuates by charging and discharging.

Examples of the olivine type lithium salt include $LiFePO_4$.

Examples of the chalcogen compound include titanium disulfide and molybdenum disulfide.

The cathode active materials may be used singly, or in combination of two or more kinds thereof.

The cathode active material contains preferably lithium manganese oxide expressed by $Li_xMn_2O_4$ or $Li_xMn_{2-y}M^3_yO_4$ from a viewpoint of safety. In a case in which lithium manganese oxide is used for a cathode active material, the content of lithium manganese oxide is preferably 30 mass % or more, and more preferably 40 mass % or more, with respect to the total amount of the cathode active material.

In a case in which the binder resin composition is used in the cathode active material layer, the amount thereof to be used is preferably an amount such that the content of the polyolefin particle in the cathode active material layer is 0.1% by mass to 10% by mass, more preferably an amount such that the content is 0.5% by mass to 8% by mass, still more preferably an amount such that the content is 2.5% by mass to 6% by mass, from the viewpoint that both battery characteristics and a PTC function are satisfied. As the proportion of the polyolefin particle is higher, the cathode active material layer may be more superior in PTC function, and as the proportion of the polyolefin particle is lower, the cathode active material layer may be more superior in battery characteristics.

Examples of the electroconductive material which may be used in a cathode active material layer include carbon black, graphite, a carbon fiber, and a metal fiber. Examples of carbon black include acetylene black, Ketjenblack, channel black, furnace black, lamp black, and thermal black. Examples of graphite include natural graphite and artificial graphite. The electroconductive materials may be used singly, or in combination of two or more kinds thereof.

In a case in which the binder resin composition is used in the cathode active material layer, the current cutoff temperature of a PTC layer is preferably set at from 70° C. to 160° C., and more preferably set at from 90° C. to 120° C. When the current cutoff temperature is set at from 70° C. to 160° C., in an incident of a trouble in a battery itself or various devices mounted with a battery, the current can be cut off so as to suppress heat generation, and also the power supply and the like from the battery to such various devices can be stopped, and therefore extremely high safety can be obtained. Further, when the current cutoff temperature is set at from 90° C. to 120° C., such advantages that malfunctioning in a normal operation can be avoided and the current can be securely cut off in an incident of a trouble such as overcharging, can be obtained. The current cutoff temperature depends on the melting point (Tm) of a polymer particle contained in the binder resin composition.

When the current cutoff temperature is to be set at from 90° C. to 120° C., it is preferable to use a polyethylene particle as a polymer particle, but a kind thereof is not intended to be limited.

The current cutoff temperature described above is a temperature in which a rate of resistance increase from a direct current resistance of the battery at 25° C. is 110% or more.

A cathode active material layer may be formed, for example, by coating a cathode mixture paste on a current collector, followed by drying, and, if necessary, by rolling. The cathode mixture paste may be prepared by adding a cathode active material and a binder resin composition together with a binder resin composition, an electroconductive material or the like, if necessary used, into a dispersing medium, followed by mixing. Examples of the dispersing medium to be used include N-methyl-2-pyrrolidone (NMP), tetrahydrofuran, and dimethyl formamide.

A packing density of the cathode active material layer for a lithium ion secondary battery in the present embodiment is preferably in a range of from 2.2 g/cm$^3$ to 2.8 g/cm$^3$, more preferably in a range of from 2.3 g/cm$^3$ to 2.7 g/cm$^3$, and still more preferably in a range of from 2.4 g/cm$^3$ to 2.6 g/cm$^3$. When the packing density of the cathode active material layer is 2.8 g/cm$^3$ or less, a nonaqueous electrolyte tends to easily infiltrate into the cathode active material layer, and the diffusion speed of lithium ions tends to increase during high-current charge and discharge, whereby the cycle performance may be improved. On the other hand, when the packing density of the cathode active material layer is 2.2 g/cm$^3$ or more, the contact between the cathode active material and the electroconductive material is fully secured, so as to reduce the electrical resistance, and the discharge rate performance may be improved.

When a cathode is produced by coating the cathode mixture paste on a cathode current collector for a lithium ion secondary battery in the present embodiment, the coating amount of the cathode mixture paste after drying a dispersing medium (cathode active material layer) is preferably in a range of from 100 g/m$^2$ to 300 g/m$^2$, more preferably in a range of from 150 g/m$^2$ to 250 g/m$^2$, and still more preferably in a range of from 180 g/m$^2$ to 220 g/m$^2$. When the coating amount is 100 g/m$^2$ or more, the cathode active material layer does not become too thin and a sufficient battery capacity can be obtained. When the coating amount is 300 g/m$^2$ or less, the cathode active material layer does not become too thick, so that unevenness in a reaction in the thickness direction does not appear during high-current charge and discharge, and the cycle performance is improved.

Meanwhile, from the viewpoints of discharge capacity and discharge rate performance, the thickness of the cathode active material layer is preferably from 50 μm to 150 μm, more preferably from 60 μm to 120 μm, and still more preferably from 70 μm to 110 μm.

(Anode)

An anode is provided to face the cathode via an insulation layer, and includes an anode current collector and an anode active material layer. Examples of the anode current collector include a sheet, a foil or the like containing a stainless steel, nickel, copper, or the like. The thickness of a sheet and a foil is not particularly limited, and is, for example, preferably from 1 μm to 500 μm, more preferably from 2 μm to 100 μm, and still more preferably from 5 μm to 50 μm. The anode active material layer is formed on either or both surfaces in the thickness direction of an anode current collector, and contains an anode active material, and, if necessary, may further contain an electroconductive material, a thickener, or the like.

The anode active material layer contains an anode active material, and is formed on the anode current collector. The formation method is not limited, and the cathode active material layer is formed, for example, as follows: the anode active material, the binder resin composition, and other material such as an electroconductive material, if necessary used, are mixed in a dry manner, thereby forming a sheet, and the sheet is pressure-bonded to the anode current collector (dry method); alternatively, the anode active material, the binder resin composition, and other material such as an electroconductive material, if necessary used, are dissolved or dispersed in a dispersion solvent, thereby forming an anode mixture paste, the anode current collector is coated with the anode mixture paste, and the resultant is dried (wet method).

As an anode active material, a material which is capable of absorbing and releasing a lithium ion and has been used commonly in the field of a lithium ion secondary battery may be used. Examples of the anode active material include metallic lithium, a lithium alloy, an intermetallic compound, a carbon material, an organic compound, an inorganic compound, a metal complex, and an organic polymer compound. The anode active materials may be used singly, or in combination of two or more kinds thereof. Among them, a carbon material is preferable as an anode active material. Examples of the carbon material include: graphite such as natural graphite (scale-like graphite, or the like) or artificial graphite; carbon black such as acetylene black, Ketjenblack, channel black, furnace black, lamp black, or thermal black; amorphous carbon; and a carbon fiber. The volume average particle diameter of a carbon material is preferably from 0.1 μm to 60 μm, and more preferably from 0.5 μm to 30 μm. Meanwhile, the BET specific surface area of a carbon material is preferably from 1 m$^2$/g to 10 m$^2$/g. Among the carbon materials, especially graphite in which a distance ($d_{002}$) between carbon hexagonal planes according to wide-angle X-ray diffractometry is from 3.35 Å to 3.40 Å, and a crystallite (Lc) in the c axis direction is 100 Å or more, is preferable from a viewpoint of further improvement of the discharge capacity of a battery.

Among the carbon materials, from the viewpoints of further improvement of cycle performance and safety, amorphous carbon in which a distance ($d_{002}$) between carbon hexagonal planes according to wide-angle X-ray diffractometry is from 3.5 Å to 3.95 Å, is preferable.

In a case in which the binder resin composition is used in the anode active material layer, the amount thereof to be used is preferably an amount such that the content of the polyolefin particle in the anode active material layer is 0.1% by mass to 8% by mass, more preferably an amount such that the content is 0.5% by mass to 5% by mass, still more preferably an amount such that the content is 1% by mass to 3% by mass.

As an electroconductive material usable for an anode active material layer, the same electroconductive material as contained in a cathode active material layer may be used.

The anode active material layer may be formed, for example, by coating an anode mixture paste on a surface of an anode current collector, followed by drying, and, if necessary, rolling.

The anode mixture paste may be prepared, for example, by adding an anode active material and a binder resin composition together with, if necessary, an electroconductive material, a thickener, or the like into a dispersing medium, followed by mixing. Examples of the dispersing medium to be used include N-methyl-2-pyrrolidone (NMP) and water.

(Insulation Layer)

An insulation layer (hereinbelow occasionally also referred to as "separator") is provided between a cathode and an anode and insulates the cathode and the anode. For an insulation layer, those having ion permeability such as an inorganic porous film may be used. As a separator, those used commonly in the field of a lithium ion secondary battery may be used, and examples thereof include a resinous porous sheet. Examples of a resin composing a resinous porous sheet include a polyolefin such as polyethylene or polypropylene, polyamide, and polyamide-imide. The resinous porous sheet includes also a nonwoven fabric, a woven fabric, and the like. Among them, a porous sheet in which pores having a diameter of from about 0.05 µm to 0.15 µm are formed inside is preferable. Such a porous sheet has high levels of ion permeability, mechanical strength, and insulation property. The thickness of a porous film is not particularly limited, and is preferably from 0.5 µm to 30 µm, and more preferably from 1 µm to 20 µm.

An inorganic porous film contains mainly an inorganic compound, and has high heat resistance. Examples of an inorganic compound include an inorganic oxide such as alumina or silica, an inorganic nitride such as BN or $Si_3N_4$, and a porous inorganic compound such as zeolite. The inorganic compounds may be used singly, or in combination of two or more kinds thereof. An inorganic porous film may further contain a heat-resistant resin. There is no particular restriction on a heat-resistant resin, and examples thereof include polyamide and polyimide. Further, the thickness of an inorganic porous film is not particularly limited, and is preferably from 0.5 µm to 30 µm, and more preferably from 1 µm to 20 µm.

(Nonaqueous Electrolyte)

Examples of a nonaqueous electrolyte include a liquid nonaqueous electrolyte, a gel-form nonaqueous electrolyte, and a solid electrolyte (for example, solid polymer electrolyte). A liquid nonaqueous electrolyte contains a solute (supporting electrolyte) and a nonaqueous solvent, and further contains, if necessary, various additives. A solute is ordinarily soluble in a nonaqueous solvent. The liquid nonaqueous electrolyte is, for example, impregnated into an insulation layer.

As the solute, those used commonly in the field may be used, and examples thereof include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, a lithium lower-aliphatic carboxylate, LiCl, LiBr, LiI, chloroborane lithium ($LiBCl_4$), a borate, and an imide salt. Examples of a borate include lithium bis(1,2-benzenediolate (2-)-O,O')borate, lithium bis(2,3-naphthalenediolate (2-)-O,O')borate, lithium bis(2,2'-biphenyldiolate (2-)-O,O') borate, and lithium bis(5-fluoro-2-olate-1-benzene sulfonic acid-O,O')borate. Examples of an imide salt include bis (trifluoromethane)sulfonimide lithium (($CF_3SO_2)_2NLi$), trifluoromethanesulfonyl (nonafluorobutane)sulfonimide lithium (($CF_3SO_2)(C_4F_9SO_2)NLi$), and bis(pentafluoroethanesulfonyl)imide lithium (($C_2F_5SO_2)_2NLi$). The solutes may be used singly, or in combination of two or more kinds thereof. The amount of a solute dissolved in a nonaqueous solvent is preferably from 0.5 mol/L to 2 mol/L.

As a nonaqueous solvent, those used commonly in the field may be used. Examples thereof include a cyclic carbonate ester, an open-chain carbonate ester, and a cyclic carboxylic acid ester. Examples of a cyclic carbonate ester include propylene carbonate (PC) and ethylene carbonate (EC). Examples of an open-chain carbonate ester include diethyl carbonate (DEC), ethyl methyl carbonate (EMC), and dimethyl carbonate (DMC). Examples of a cyclic carboxylic acid ester include γ-butyrolactone (GBL) and γ-valerolactone (GVL). The nonaqueous solvents may be used singly, or, if necessary, used in combination of two or more kinds thereof.

The nonaqueous solvent contains preferably vinylene carbonate (VC) from a viewpoint of further improvement of battery characteristics.

When vinylene carbonate (VC) is contained, the content thereof with respect to the total amount of the nonaqueous solvent is preferably from 0.1 mass % to 2 mass %, and more preferably from 0.2 mass % to 1.5 mass %.

(Configuration of Lithium Ion Secondary Battery)

An embodiment in which the lithium ion secondary battery is a coin-type battery will be described.

A coin-type battery may be produced, for example, as follows. First, a cathode and an anode are cut into circular shapes smaller than a coin external can. A cathode, an insulation layer, and an anode are layered in this order to produce a laminate. The laminate is then placed as it is in a coin external can, a nonaqueous electrolyte is injected into the coin external can, and then the coin external can is closed tightly, thereby obtaining a lithium ion secondary battery.

Next, an embodiment in which the lithium ion secondary battery is a laminated battery will be described.

A laminated lithium ion secondary battery may be produced, for example, as follows. First, a cathode and an anode are cut into rectangular shapes, to each of which a tab is welded to prepare a positive or an anode terminal. A cathode, an insulation layer, and an anode are layered in this order to produce a laminate. The laminate is then placed as it is in an aluminum-made laminate package with the positive and anode terminals being extended outward from the aluminum laminate package, and then the laminate package is closed tightly. Next, a nonaqueous electrolyte is injected into the aluminum laminate package and an opening in the aluminum laminate package is closed tightly, thereby obtaining a lithium ion secondary battery.

Next, an embodiment in which the lithium ion secondary battery is 18650-type cylindrical one will be described by referring to a drawing.

As depicted in the Figure, a lithium ion secondary battery 1 of the present embodiment has a closed-bottom cylindrical battery container 6, which is made of nickel plated steel. The battery container 6 accommodates an electrode group 5 having a spiral cross-section formed by coiling a cathode plate 2 and an anode plate 3 both in a strip shape via a separator 4. The electrode group 5 is a coil with a spiral cross-section of a cathode plate 2 and an anode plate 3 via a separator 4 which is a polyethylene-made porous sheet. The separator 4 is defined, for example, in a size of 58 mm in width and 30 µm in thickness. A ribbon-shaped aluminum-made cathode tab terminal, an end of which is fixed to the cathode plate 2, protrudes from the upper end surface of the electrode group 5. The other end of the cathode tab terminal is fixed by ultrasonic welding to the lower surface of a disk-shaped battery cover, which is placed above the electrode group 5 and works as a cathode external terminal. Meanwhile, a ribbon-shaped copper-made anode tab terminal, an end of which is fixed to the anode plate 3, protrudes from the lower end surface of the electrode group 5. The other end of the anode tab terminal is fixed by resistance welding to the internal bottom of a battery container 6.

Therefore, the cathode tab terminal and the anode tab terminal protrude in mutually opposite directions from either of the end surfaces of the electrode group 5. In this regard, around the entire outer circumference of the electrode group 5, an insulation cover is provided, depiction of which is omitted. The battery cover is fixed to the upper edge of the battery container 6 by crimping via a resinous insulation gasket. Therefore, the inside of the lithium ion secondary battery 1 is isolated tightly. Inside the battery container 6, a nonaqueous electrolyte solution has been filled (not depicted).

With respect to a lithium ion secondary battery in the present embodiment, a rate of resistance increase from a direct current resistance of the battery at 25° C. to a direct current resistance at 160° C. is preferably 110% or more, more preferably 130% or more, and still more preferably 140% or more, in view of a service environment.

A lithium ion secondary battery in the present embodiment offers high safety as well as high power, and is capable of being applied favorably to the same uses as a conventional nonaqueous electrolyte secondary battery. It can be favorably used especially as a power source for various portable electronic devices such as a cell phone, a notebook computer, a portable information terminal, an electronic dictionary, or a video game console. When the battery is applied to such uses, even when an overcharging condition appears by any chance during battery charging, heat generation can be suppressed, so that heating-up, swelling, or the like of the battery can be prevented securely. Further, a lithium ion secondary battery in the present embodiment is capable of being also applied to the uses in power storage, a transportation machine such as an electric car or a hybrid car, and the like.

EXAMPLES

The present invention will be described more specifically below by way of examples, provided that the present invention be not limited thereto.

Synthesis Example 1

A 3-L separable flask equipped with a stirrer, a thermometer, a condenser and a nitrogen gas introduction tube was charged with 1804 g of purified water, the temperature was raised to 74° C. with stirring in a condition of a flow rate of nitrogen gas of 200 mL/min, and then flowing of nitrogen gas was stopped. Next, an aqueous solution in which 0.968 g of ammonium persulfate as a polymerization initiator was dissolved in 76 g of purified water was added, and a mixed liquid of 183.8 g of acrylonitrile as a nitrile group-containing monomer, 9.7 g (a proportion of 0.039 mol with respect to 1 mol of acrylonitrile) of acrylic acid as a carboxyl group-containing monomer and 6.5 g (a proportion of 0.0085 mol with respect to 1 mol of acrylonitrile) of methoxy triethylene glycol acrylate (trade name: NK ESTER AM-30G produced by Shin-Nakamura Chemical Co., Ltd.) as a monomer represented by Formula (I) was immediately dropped over 2 hours with the temperature of the reaction system being kept at 74° C.±2° C. Subsequently, an aqueous solution in which 0.25 g of ammonium persulfate was dissolved in 21.3 g of purified water was additionally added to the reaction system suspended, the temperature was raised to 84° C., and then the reaction was allowed to progress for 2.5 hours with the temperature of the reaction system being kept at 84° C.±2° C. Thereafter, the resultant was cooled to 40° C. over 1 hour, then stirring was stopped, and the resultant was left to be cooled at room temperature (25° C.) overnight, thereby obtaining a reaction liquid in which a resin having a nitrile group was precipitated. The reaction liquid was subjected to suction filtration, and a wet precipitate recovered was washed with 1800 g of purified water three times and then dried in vacuum at 80° C. for 10 hours, thereby obtaining resin A having a nitrile group.

Synthesis Example 2

A 1.0-L separable flask equipped with a stirrer, a thermometer and a condenser was charged with 45.0 g of acrylonitrile (produced by Wako Pure Chemical Industries, Ltd.) as a nitrile group-containing monomer, 5.0 g (a proportion of 0.0232 mol with respect to 1 mol of acrylonitrile) of lauryl acrylate (produced by Sigma-Aldrich Co., LLC) as a monomer represented by Formula (II), 1.175 mg of potassium persulfate (produced by Wako Pure Chemical Industries, Ltd.) as a polymerization initiator, 135 mg of an α-methylstyrene dimer (produced by Wako Pure Chemical Industries, Ltd.) as a chain transfer agent, and 450 mL of purified water (produced by Wako Pure Chemical Industries, Ltd.) under a nitrogen atmosphere, thereby preparing a reaction liquid. The reaction was allowed to progress at 60° C. for 3 hours with the reaction liquid being vigorously stirred, and then the reaction was allowed to progress at 80° C. for 3 hours. After cooling to room temperature (25° C.), the reaction liquid was subjected to suction filtration, and a resin precipitated was separated by filtration. The resin separated by filtration was sequentially washed with 300 mL of purified water (produced by Wako Pure Chemical Industries, Ltd.) and 300 mL of acetone (produced by Wako Pure Chemical Industries, Ltd.). The resin washed was dried in a vacuum drier at 60° C. and 1 ton (133 Pa) for 24 hours, thereby obtaining resin B having a nitrile group.

Example 1

(1) Preparation of Binder Resin Composition

A 1-L eggplant-shaped flask sufficiently dried was charged with 45 g of Chemipearl (registered trademark) W310 (water-dispersing polyethylene particle, solid content: 40% by mass, average particle diameter: 9.5 μm (a value in catalog of Mitsui Chemicals, Inc.), softening point: 132° C. (a value in catalog of Mitsui Chemicals, Inc.), produced by Mitsui Chemicals, Inc.), 108 g of N-methyl-2-pyrrolidone (organic solvent, produced by Wako Pure Chemical Industries, Ltd., special grade) was added with stirring and stirred for additional 5 minutes, and then the resulting mixed liquid was concentrated under reduced pressure by an evaporator until the concentration of the polyethylene particle in the mixed liquid reached 25% by mass. A solution (67 g) (the content of resin A: 6% by mass) in which resin A (polymer soluble in the organic solvent) obtained in Synthesis Example 1 was dissolved in N-methyl-2-pyrrolidone was added to the resulting mixed liquid, and stirred for 5 minutes, thereby obtaining binder resin composition (1). The viscosity of binder resin composition (1), measured with an E-type viscometer at 25° C. at a rotation speed of 50 rotations per minute, was 285 mPa·s. Herein, VISCONIC-E Model manufactured by Tokyo Keiki Inc. was used as the E-type viscometer.

(2) Production of Cathode

First, $LiMn_2O_4$ (cathode active material, Mitsui Mining & Smelting Co., Ltd.), acetylene black (electroconductive material, trade name: HS-100, average particle diameter 48 nm (a value in catalog of Denka Company Limited), Denka Company Limited), and binder resin composition (1) were mixed so that mass ratio of the solid contents of the cathode active, the electroconductive material the resin A and polyethylene particles was 90: 4.5: 1.0: 4.5, thereby preparing a cathode mixture paste. The cathode mixture paste was coated on one surface of an aluminium foil (cathode current collector, Mitsubishi Aluminium Co., Ltd.), dried at 60° C. for 5 hours, and then rolled to form a cathode active material layer with a thickness of 75 μm, a coating amount of 200 g/m$^2$, and a mixture density of 2.55 g/cm$^3$, thereby producing a cathode A. The cathode A was heated with a constant-temperature oven at 120° C. for 15 minutes, thereby producing a cathode B. Next, the cathode A was heated with a constant-temperature oven at 160° C. for 15 minutes, thereby producing a cathode B.

(3) Production of Anode

Amorphous carbon (anode active material), acetylene black (electroconductive material, trade name: HS-100, average particle diameter: 48 nm (a value in catalog of Denka Company Limited), produced by Denka Company Limited), and a polyvinylidene fluoride solution (binder, solid content: 12% by mass) were mixed such that the mass ratio of the solid contents (anode active material:electroconductive particle:binder) was 87.6:4.8:7.6, and the resulting mixture was sufficiently dispersed in N-methyl-2-pyrrolidone (solvent, produced by Wako Pure Chemical Industries, Ltd., special grade), thereby preparing an anode mixture paste. A copper foil having a thickness of 10 μm (anode current collector) was coated with the anode mixture paste, and the resultant was dried at 100° C. for 30 minutes and then rolled, thereby forming an anode active material layer having a thickness of 62 μm, an amount of coating of 60 g/m$^2$, and a mixture density of 0.97 g/cm$^3$ to produce an anode.

(4) Production of Coin-Type Battery

Cathode A, cathode B, and cathode C produced were cut to respective circle shapes having a diameter of 14 mm, thereby obtaining respective three cathodes for evaluation. An anode produced was cut to a circle shape having a diameter of 16 mm, thereby obtaining an anode for evaluation. Each of the three cathodes for evaluation, and the anode for evaluation were stacked via a separator (trade name: Hipore, manufactured by ASAHI KASEI E-MATERIALS CORPORATION, cut to a circle shape having a diameter of 19 mm) made of a microporous film of polyethylene being interposed, thereby obtaining a laminate in which each of the three cathodes for evaluation, and the anode for evaluation were stacked such that respective active material layers were opposite to each other. Each of such three laminates was placed into a coin external can (manufactured by TOYO SYSTEM Co., LTD.), 1 mL of an electrolyte solution (0.5 mol % of vinylene carbonate was added to a mixed solution of ethylene carbonate/dimethyl carbonate=3/7 (volume ratio), including 1 M LiPF$_6$)) was added, and then the coin external can was closed tightly, thereby producing each of three batteries for electrode evaluation.

Example 2

Binder resin composition (2) was prepared in the same manner as in Experiment Example 1 except that Chemipearl (registered trademark) W308 (water-dispersing polyethylene particle, solid content: 40% by mass, average particle diameter: 6.0 μm (a value in catalog of Mitsui Chemicals, Inc.), softening point: 132° C. (a value in catalog of Mitsui Chemicals, Inc.), produced by Mitsui Chemicals, Inc.) was used as the polyolefin particle. The viscosity of binder resin composition (2), measured in the same manner as in Example 1, was 297 mPa·s. Three batteries for electrode evaluation were produced in the same manner as in Example 1 except that binder resin composition (2) was used instead of binder resin composition (1).

Example 3

Binder resin composition (3) was prepared in the same manner as in Experiment Example 1 except that Chemipearl (registered trademark) W410 (water-dispersing polyethylene particle, solid content: 40% by mass, average particle diameter: 9.5 μm (a value in catalog of Mitsui Chemicals, Inc.), softening point: 110° C. (a value in catalog of Mitsui Chemicals, Inc.), produced by Mitsui Chemicals, Inc.) was used as the polyolefin particle. The viscosity of binder resin composition (3), measured in the same manner as in Example 1, was 305 mPa·s. Three batteries for electrode evaluation were produced in the same manner as in Example 1 except that binder resin composition (3) was used instead of binder resin composition (1).

Example 4

Binder resin composition (4) was prepared in the same manner as in Experiment Example 1 except that Chemipearl (registered trademark) W408 (water-dispersing polyethylene particle, solid content: 40% by mass, average particle diameter: 6.0 μm (a value in catalog of Mitsui Chemicals, Inc.), softening point: 110° C. (a value in catalog of Mitsui Chemicals, Inc.), produced by Mitsui Chemicals, Inc.) was used as the polyolefin particle. The viscosity of binder resin composition (4), measured in the same manner as in Example 1, was 300 mPa·s. Three batteries for electrode evaluation were produced in the same manner as in Example 1 except that binder resin composition (4) was used instead of binder resin composition (1).

Example 5

Binder resin composition (5) was prepared in the same manner as in Experiment Example 1 except that Chemipearl (registered trademark) W300 (water-dispersing polyethylene particle, solid content: 40% by mass, average particle diameter: 3.0 μm (a value in catalog of Mitsui Chemicals, Inc.), softening point: 132° C. (a value in catalog of Mitsui Chemicals, Inc.), produced by Mitsui Chemicals, Inc.) was used as the polyolefin particle. The viscosity of binder resin composition (5), measured in the same manner as in Example 1, was 311 mPa·s. Three batteries for electrode evaluation were produced in the same manner as in Example 1 except that binder resin composition (5) was used instead of binder resin composition (1).

Example 6

Binder resin composition (6) was prepared in the same manner as in Example 3 except that resin B was used as the polymer soluble in the organic solvent, instead of resin A. The viscosity of binder resin composition (6), measured in the same manner as in Example 1, was 275 mPa·s. Three batteries for electrode evaluation were produced in the same manner as in Example 3 except that binder resin composition (6) was used instead of binder resin composition (1).

Example 7

Binder resin composition (7) was prepared in the same manner as in Example 3 except that polyvinylidene fluoride was used as the polymer soluble in the organic solvent, instead of resin A. The viscosity of binder resin composition (7), measured in the same manner as in Example 1, was 217 mPa·s. Three batteries for electrode evaluation were produced in the same manner as in Example 3 except that binder resin composition (7) was used instead of binder resin composition (1).

Comparative Example 1

A 1-L eggplant-shaped flask sufficiently dried was charged with 45 g of Chemipearl (registered trademark) W310 (water-dispersing polyethylene particle, solid content: 40% by mass, average particle diameter: 9.5 μm (a value in catalog of Mitsui Chemicals, Inc.), softening point: 132° C. (a value in catalog of Mitsui Chemicals, Inc.), produced by Mitsui Chemicals, Inc.), 108 g of N-methyl-2-pyrrolidone (organic solvent, produced by Wako Pure Chemical Industries, Ltd., special grade) was added with stirring and stirred for additional 5 minutes, and then the resulting mixed liquid was concentrated under reduced pressure by an evaporator until the concentration of the polyethylene particle in the mixed liquid reached 25% by mass, thereby obtaining binder resin composition (8). The viscosity of binder resin composition (8), measured in the same manner as in Example 1, was 15 mPa·s. Three batteries for electrode evaluation were produced in the same manner as in Example 1 except that binder resin composition (8) was used instead of binder resin composition (1).

Comparative Example 2

$LiMnO_2O_4$ (cathode active material, produced by MITSUI MINING & SMELTING CO., LTD.), acetylene black (electroconductive material, trade name: HS-100, average particle diameter: 48 nm (a value in catalog of Denka Company Limited), produced by Denka Company Limited), resin A described in Synthesis Example 1, and a powdered polyolefin particle (powder form obtained by drying Chemipearl (registered trademark) W410) were mixed such that the mass ratio of the solid contents (cathode active material: electroconductive material:resin A:polyethylene particle) was 90.0:4.5:1.0:4.5, and the resulting mixture was sufficiently dispersed in N-methyl-2-pyrrolidone (solvent, produced by Wako Pure Chemical Industries, Ltd., special grade), thereby preparing a cathode mixture paste. Three batteries for electrode evaluation were produced in the same manner as in Example 3 except that the cathode mixture paste was used.

(Evaluation Methods)

(1) Evaluation of Dispersibility

The binder resin composition obtained in each of Examples 1 to 7 and Comparative Example 1 was left to stand, and the dispersion state was observed immediately after such standing, after a lapse of 24 hours, after a lapse of 7 days, after a lapse of 14 days, and after a lapse of 28 days. A state in which the polyethylene particle was dispersed in the entire binder resin composition was rated as "A", and a state in which the polyolefin particle was separated into the upper layer of the binder resin composition was rated as "B". In Comparative Example 2, no binder resin composition was prepared and therefore dispersibility was not evaluated.

(2) Evaluation of Discharge Rate Performance

The battery for electrode evaluation in which cathode A was used, in each of Examples 1 to 7 and Comparative Examples 1 to 2, was placed in a thermostat bath set at 25° C., and subjected to charge and discharge with a charge and discharge apparatus (manufactured by TOYO SYSTEM Co., LTD., trade name: TOSCAT-3200) at 25° C. in the following conditions. After constant current/constant voltage (CCCV) charge was performed at 4.2 V and 0.5 C, constant current (CC) discharge was performed to 2.7 V at 0.5 C, and the discharge capacity was measured. Next, constant current/constant voltage (CCCV) charge was performed at 4.2 V and 0.5 C, then constant current (CC) discharge was performed to 2.7 V at 3.0 C, and the value obtained by calculation from the following equation was defined as the discharge rate performance. Herein, C representing the discharge current value means "Current value (A)/Battery capacity (Ah)".

Discharge rate performance(%)=(Discharge capacity at 3 C/Discharge capacity at 0.5 C)×100

(3) PTC Characteristics (Rate of Resistance Increase) at 120° C.

The battery for electrode evaluation in which cathode A was used, in each of Examples 1 to 7 and Comparative Examples 1 to 2, was placed in a thermostat bath set at 25° C., and the direct current resistance (DCR) at 25° C. was measured and defined as the initial resistance. Next, the battery for electrode evaluation in which cathode B was used, in each of Examples 1 to 7 and Comparative Examples 1 to 2, was placed in a thermostat bath set at 25° C., and the direct current resistance (DCR) at 25° C. was measured and defined as the resistance after heating. The rate of resistance increase (%) was calculated from the initial resistance and the resistance after heating, according to the following equation and was used as the index of a PTC function at 120° C.

Rate of resistance increase(%)=(Resistance after heating/Initial resistance)×100

Herein, the direct current resistance (DCR) was calculated from the following equation.

Direct current resistance(DCR)=$\{(\Delta V_{1C}-V)(I_{1C}-I)+(\Delta V_{3C}-V)(I_{3C}-I)+(\Delta V_{5C}-V)(I_{5C}-I)\}/\{(I_{1C}-I)^2+(I_{3C}-I)^2+(I_{5C}-I)^2\}$ Here, $I=(I_{1C}+I_{3C}+I_{5C})/3$ and $V=(\Delta V_{1C}+\Delta V_{3C}+\Delta V_{5C})/3$ are satisfied, $I_{1C}$, $I_{3C}$, and $I_{5C}$ represent the respective discharge current values at corresponding 1 C, 3 C, and 5 C, and $\Delta V_{1C}$, $\Delta V_{3C}$, and $\Delta V_{5C}$ represent the respective changes in voltage after 10 seconds from the initiation of discharge at the corresponding respective discharge current values.

(4) PTC Characteristics (Rate of Resistance Increase) at 160° C.

The rate of resistance increase (%) was calculated in the same manner as in (3) PTC Characteristics (Rate of Resistance Increase) at 120° C. except that the battery for electrode evaluation in which cathode C was used, in each of Examples 1 to 7 and Comparative Examples 1 to 2, was placed in a thermostat bath set at 25° C., and the direct current resistance (DCR) at 25° C. was measured and defined as the resistance after heating. The resulting rate was used as the index of a PTC function at 160° C.

The evaluation results of Examples 1 to 7 and Comparative Examples 1 to 2 are shown in Table 1. In Table 1, "-" with respect to any component in the binder resin composition means that the corresponding component was not compounded, and "-" with respect to the viscosity means that the viscosity was not measured.

TABLE 1

| | Items | | Example 1 | Example 2 | Example 3 | Example 4 | Example 5 | Example 6 | Example 7 | Comparative Example 1 | Comparative Example 2 |
|---|---|---|---|---|---|---|---|---|---|---|---|
| Solid content composition (% by mass) in binder resin composition | Polyolefin particle | W310 | 81.8 | — | — | — | — | — | — | 100 | — |
| | | W308 | — | 81.8 | — | — | — | — | — | — | — |
| | | W410 | — | — | 81.8 | — | — | 81.8 | 81.8 | — | 81.8 (Powder) |
| | | W408 | — | — | — | 81.8 | — | — | — | — | — |
| | | W300 | — | — | — | — | 81.8 | — | — | — | — |
| | Polymer soluble in organic solvent | Resin A | 18.2 | 18.2 | 18.2 | 18.2 | 18.2 | — | — | — | 18.2 |
| | | Resin B | — | — | — | — | — | 18.2 | — | — | — |
| | | Polyvinylidene fluoride | — | — | — | — | — | — | 18.2 | — | — |
| | Viscosity (mPa·s) | | 285 | 297 | 305 | 300 | 311 | 275 | 217 | 15 | — |
| Discharge rate performance (%) | | | 90.3 | 90.8 | 90.4 | 90.1 | 90.7 | 84.7 | 87.2 | 90.3 | 80.1 |
| PTC characteristics Rate of resistance increase (%) | | 120° C. | 100 | 100 | 152 | 146 | 100 | 139 | 140 | 100 | 140 |
| | | 160° C. | 118 | 148 | 153 | 147 | 114 | 139 | 140 | 118 | 140 |
| Dispersibility | | Immediate after standing | A | A | A | A | A | A | A | A | — |
| | | After 24 hours | A | A | A | A | A | A | A | B | — |
| | | After 7 days | A | A | A | A | A | A | A | B | — |
| | | After 14 days | A | A | A | A | A | A | A | B | — |
| | | After 28 days | A | A | A | A | B | A | B | B | — |

In Examples 1 to 7, the binder resin composition was superior in dispersibility of the polyolefin particle, and the polyethylene particle was dispersed in the entire binder resin composition even after a lapse of 14 days after the standing. Furthermore, in Examples 1 to 7, the battery for electrode evaluation exhibited superior discharge rate performance. Moreover, in Examples 1 to 7, the battery for electrode evaluation was superior in PTC characteristics at 160° C. It was confirmed from the results that the battery for electrode evaluation of each of Examples 1 to 7 had a function of increasing the internal resistance of the battery when a temperature increased, and had superior battery characteristics in a normal operation.

In Comparative Example 1, the binder resin composition not having any polymer soluble in the organic solvent was inferior in dispersibility of the polyolefin particle, and the polyolefin particle was separated into the upper layer of the binder resin composition at a lapse of 24 hours after the standing. It was expected from the results that a case in which the binder resin composition of Comparative Example 1 was used had difficulty in producing a uniform electrode active material layer.

Furthermore, the battery for electrode evaluation of Comparative Example 2 in which the binder resin composition was not used and the powdered polyolefin particle was used for cathode production was superior in PTC characteristics, but inferior in discharge rate performance.

Meanwhile, the entire contents of the disclosures of Japanese Patent Application No. 2015-54733 filed on Mar. 18, 2015 are incorporated herein by reference.

Further, all the literature, patent application, and technical standards cited herein are also herein incorporated to the same extent as provided for specifically and severally with respect to an individual literature, patent application, and technical standard to the effect that the same should be so incorporated by reference.

The invention claimed is:

1. A binder resin composition comprising;
    a polyolefin particle;
    an organic solvent; and
    a polymer that is soluble in the organic solvent, wherein the polymer comprises a polymer that has a structural unit having a nitrile group, and at least one structural unit selected from the group consisting of a structural unit derived from a monomer represented by the following Formula (I) and a structural unit derived from a monomer represented by the following Formula (II);

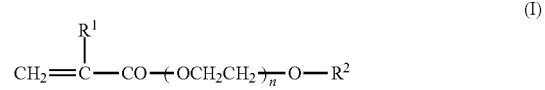

(I)

wherein in Formula (I), R1 is H or CH3 R2 is H or a monovalent hydrocarbon group, and n is a number of from 1 to 50,

(II)

wherein in Formula (II), R3 is H or CH3, and R4 is an alkyl group having from 4 to 100 carbon atoms.

2. The binder resin composition according to claim 1, wherein an average particle diameter of the polyolefin particle is from 0.1 μm to 30 μm.

3. The binder resin composition according to claim 1, wherein a content of the polyolefin particle is from 1% by mass to 60% by mass with respect to the total mass of binder resin composition.

4. The binder resin composition according to claim 1, wherein the organic solvent comprises N-methyl-2-pyrrolidone.

5. The binder resin composition according to claim 1, wherein a viscosity of the binder resin composition is from 100 mPa·s to 1,500 mPa·s measured with an E-type viscometer at 25° C. at a rotation speed of 50 rotations per minute.

6. An electrode for a lithium ion secondary battery, produced by:
    providing the binder resin composition according to claim 1, the binder resin composition not including an active material;

mixing the binder resin composition with a cathode active material or an anode active material to form a cathode or anode mixture; and coating at least one side of a current collector with the cathode or anode mixture.

7. A lithium ion secondary battery, comprising the electrode for a lithium ion secondary battery according to claim 6.

* * * * *